United States Patent
Brandow et al.

[11] Patent Number: 6,064,957
[45] Date of Patent: *May 16, 2000

[54] IMPROVING SPEECH RECOGNITION THROUGH TEXT-BASED LINGUISTIC POST-PROCESSING

[75] Inventors: Ronald Lloyd Brandow, Nassau; Tomasz Strzalkowski, Schenectady, both of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/911,247

[22] Filed: Aug. 15, 1997

[51] Int. Cl.$^7$ ........................................................ G10L 5/06
[52] U.S. Cl. ............................................ 704/235; 704/231
[58] Field of Search ................................... 704/231, 243, 704/244, 255, 256

[56] References Cited

U.S. PATENT DOCUMENTS

| | | | |
|---|---|---|---|
| 4,777,600 | 10/1988 | Saito et al. | 364/419 |
| 4,811,400 | 3/1989 | Fisher | 381/44 |
| 4,975,957 | 12/1990 | Ichikawa et al. | 381/36 |
| 5,021,113 | 6/1991 | Hollerbauer | 364/513.5 |
| 5,027,406 | 6/1991 | Roberts et al. | 381/43 |
| 5,220,503 | 6/1993 | Suzuki et al. | 364/419 |
| 5,333,275 | 7/1994 | Wheatley et al. | 395/2.52 |
| 5,636,325 | 6/1997 | Farrett | 395/2.67 |
| 5,649,060 | 7/1997 | Ellozy et al. | 395/2.87 |
| 5,704,006 | 12/1997 | Iwahashi | 395/2.68 |
| 5,715,367 | 2/1998 | Gillick et al. | 395/2.63 |
| 5,737,725 | 4/1998 | Case | 704/260 |
| 5,752,227 | 5/1998 | Lyberg | 704/235 |
| 5,765,131 | 6/1998 | Stentiford et al. | 704/277 |
| 5,805,832 | 9/1998 | Brown et al. | 395/752 |

OTHER PUBLICATIONS

"Combining Trigram–Based and Feature–Based Methods for Context–Sensitive Spelling Correction" by A. Golding, et al, Proceeding of 34th Annual Meeting of the ACL, Santa Cruz, pp. 71–78, 1996.

"Error correction via a Post–Processor for Continuous Speech Recognition" by EK Ringger, et al. In Proc. of ICASSP–96, pp. 35–41, 1995.

"NYU Language Modeling Experiments for the 1995 CSR Evaluation" by S. Sekine, et al, Spoken Language Systems Technology Workshop, NY, NY, pp. 123–128.

:"Multi–Font Recognition fo Printed Arabic Using the BBN Byblos Speech Recognition System", LaPre et al, pp. 2136–2139, 1996.

*Primary Examiner*—David R. Hudspeth
*Assistant Examiner*—Michael N. Opsasnick
*Attorney, Agent, or Firm*—David C. Goldman; Jill M. Breedlove

[57] ABSTRACT

The present invention discloses a method and system for improving speech recognition. In this invention, there is a training phase where text data generated from a speech recognition system is collected and aligned with a corresponding true transcription of the speech recognition text data. A preliminary set of correction rules are generated and observed against a corpus of fully verified text data. Rules that are applicable are validated, while invalid rules are updated. The updated rules are then applied to the parallel sample of speech recognition text data and corresponding text data, as well as the corpus of text data. The rules are examined again to determine their validity. This process continues until all of the rules have been validated or until no further progress is made. The finalized correction rules are then put into a production phase.

18 Claims, 4 Drawing Sheets

IMPROVING SPEECH RECOGNITION THROUGH TEXT-BASED LINGUISTIC POST-PROCESSING

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of contract No. 70NANB5H1195 awarded by NIST.

FIELD OF THE INVENTION

The present invention relates generally to speech recognition and more particularly to improving the accuracy of speech recognition through linguistic post-processing.

BACKGROUND OF THE INVENTION

Speech recognition is the process of converting an acoustic signal, captured by a microphone or a telephone, to a set of words. In a typical speech recognition system, the acoustic signal is converted into a digitized speech signal and then segmented into a set of speech segments. Each set of speech segments contains useful measurements or features known as phonemes. Phonemes are the smallest sound units of which words are composed of. The phonemes are then represented by using a phonetic language model such as a 2-phoneme or 3-phoneme hidden Markov model (HMM). The HMM captures and represents patterns of variation of the phonemes into phoneme groups. The phoneme groups are then applied to a language model such as a 2-gram or 3-gram HMM, which is used to recognize the most probable words for each group and then transcribe the words. A majority of the transcription errors in a speech recognition system are due to the underlying language models and the specific speech patterns of a speaker or group of speakers. In order to reduce the amount of errors, many advanced speech recognition systems utilize trainable language models that can be optimized for a particular speaker as well as for a specific sub-language usage (e.g., the field of radiology). However, even with optimization, these speech recognition systems cannot guarantee consistent, high accuracy performance, because of the limited capabilities of their underlying language models. Therefore, there is a need to be able to compensate for the limited capabilities of the language models in a speech recognition system in order to provide consistent, high accuracy speech recognition.

SUMMARY OF THE INVENTION

In accordance with one embodiment of this invention, there is provided a method for improving speech recognition. In this embodiment, text data generated from a speech recognition system is collected. In addition, a corresponding true transcription of the speech recognition text data is collected. The text data generated from the speech recognition system is then aligned with the corresponding true transcription of text data. A plurality of correction rules are generated from differences in alignment between the text data generated from the speech recognition system and the corresponding true transcription of text data. The plurality of correction rules are then applied to new text data generated from a speech recognition system.

In accordance with a second embodiment of this invention, there is provided a system for improving speech recognition. The system comprises a text aligner for aligning text data generated from a speech recognition system with a corresponding true transcription of the speech recognition text data. A rule generator coupled to the text aligner, generates a plurality of correction rules from differences in alignment between the speech recognition text data and the corresponding true transcription of text data. A rule administrator applies the plurality of correction rules to new text data generated from a speech recognition system.

DETAILED DESCRIPTION OF THE INVENTION

The speech recognition correction system of this invention includes a training phase and a production phase. Both the training phase and the production phase are embedded in a computer such as a workstation. However, other types of computers can be used such as a mainframe, a minicomputer, a microcomputer, or a supercomputer. In the training phase, a set of correction rules are developed for correcting text data that is generated from a speech recognition system. The correction rules are validated with a large corpus of fully verified text data. Rules that are invalidated are either revised or abandoned. The revised rules are then validated and revised again if necessary. This process continues until all of the rules have been validated or abandoned. After the correction rules have been validated, the rules are put into the production phase and used to correct the text data generated from a speech recognition system.

Figure 1:
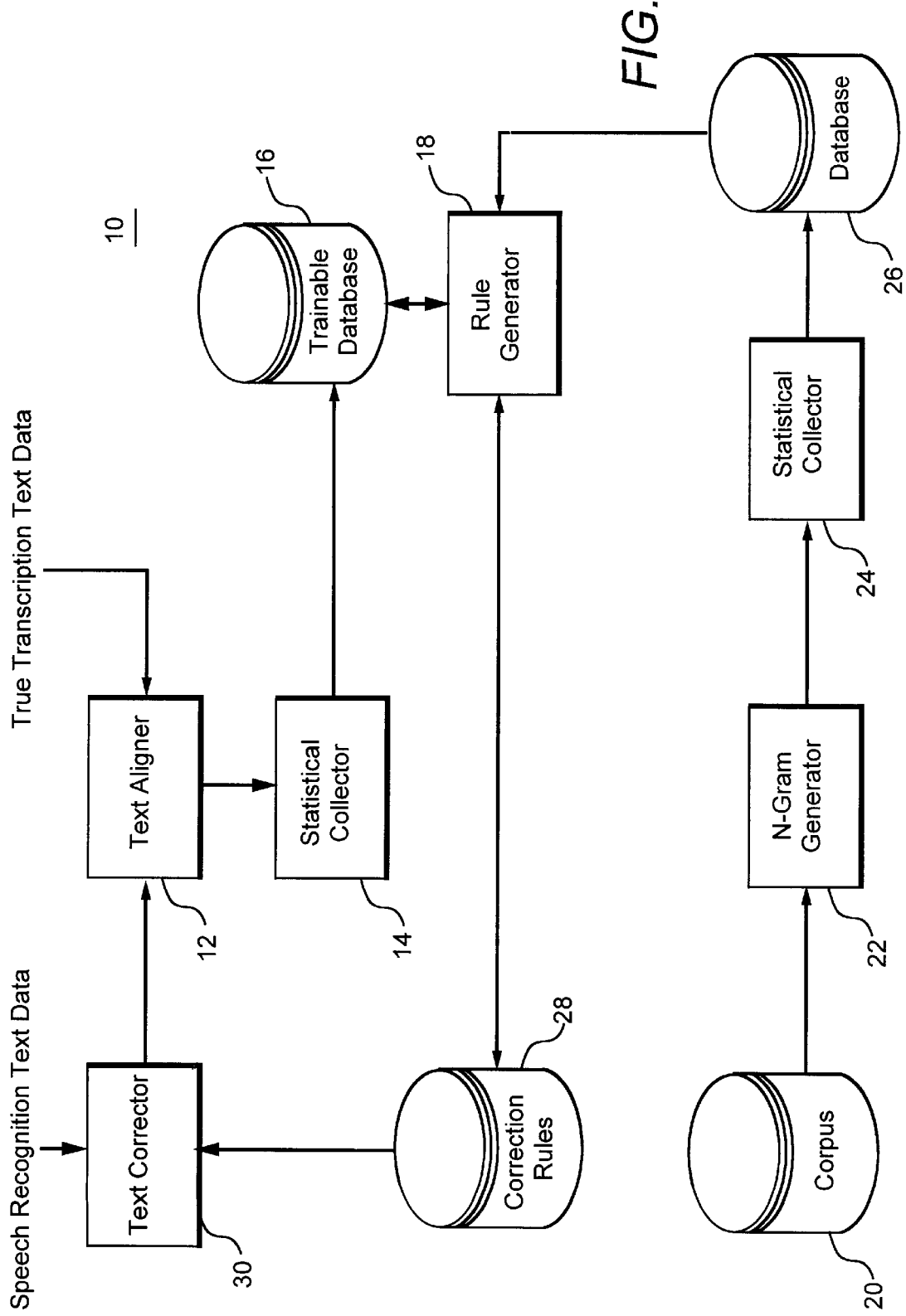
FIG. 1 shows a block diagram of a training unit that is used in this invention to develop a set of correction rules.

FIG. 1 shows a block diagram of a training unit 10 that is used in this invention to develop a set of correction rules. In the training unit 10, text data generated from a speech recognition system is collected and inputted to a text aligner 12. In this invention, the speech recognition text data can be generated from any type of speech recognition system such as an isolated-word speech recognition system or a continuous speech recognition system. A corresponding true transcription of the speech recognition text data is also collected and inputted to the text aligner 12. The corresponding true transcription of text data is a manually verified transcription of the exact voice input that was inputted to the speech recognition system. The text aligner 12 aligns the speech recognition text data with the corresponding true transcription of text data. The parallel text samples are aligned by the text aligner 12 on the word level. Preferably, the alignment is achieved by first aligning content-word islands, which are segments of text comprising of one or more content words, surrounded by non-content words. Content words are nouns, verbs, adjectives, adverbs, etc., other than articles, prepositions and conjunctions. After aligning the content-word islands, the remaining words are then aligned.

The text aligner 12 uses a set of heuristics to help with the alignment of string correspondences between the parallel text samples. For example, this invention includes a heuristic that instructs the text aligner 12 to align strings in the parallel text samples that are different in print, but are close phonetic variants. Another type of heuristic is aligning strings that differ on the character level, especially if the replacement scope is unknown. Additionally, another type of heuristic is to align strings that differ by a known spelling variant. For example, "1" would be aligned with "one", "Xray" would be aligned with "X-ray". These examples of heuristics are illustrative of some of the possible heuristics that are used in the text aligner 12 and are not an exhaustive list of the heuristics that could be used.

All of the misaligned sections between the speech recognition text data and the corresponding true transcription of text data are noted by the text aligner 12 as an error. All of the misaligned sections are sent to a statistical collector 14 which counts the number of times that the misaligned sections have occurred in the training sample of parallel text. The misaligned sections along with the number of times that the misalignment has occurred in the training sample of parallel text are then stored in a trainable database 16. The misaligned sections give rise to a set of preliminary context-free string replacement rules for the parallel text samples. A rule generator 18 uses the perceived differences in alignment between the speech recognition text data and the corresponding true transcription of text data to derive a set of context-free rules. In this invention, the context-free rules generated by the rule generator 18 are noted in this invention as:

$$L \Rightarrow R, \text{wherein} \qquad (1)$$

L is a section in the output of the speech recognition system and R is the corresponding section in the true transcription of text data. For example, the following replacement rules are obtained:

there were made ⇒ the remainder this or ⇒ the support by aligning the following two sentences:

s1: THERE WERE MADE OF THIS OR LINES AND TUBES ARE UNCHANGED IN POSITION;

s2: THE REMAINDER OF THE SUPPORT LINES AND TUBES ARE UNCHANGED IN POSITION;

wherein s1 is the output of the speech recognition system and s2 is the corresponding section of true transcription text data. In this example, "there were made" from s1 is aligned with "the remainder" in s2, "of" from s1 is aligned with "of" in s2, "this or" from s1 is aligned with "the support" in s2, "lines and tubes" from s1 is aligned with "lines and tubes" in s2, "are unchanged" from s1 is aligned with "are unchanged" in s2, and "in position" from s1 is aligned with "in position" in s2.

The candidate set of preliminary context-free string replacement rules generated by the rule generator 18 are validated by observing their applicability across a training collection as well as the parallel text samples. The training collection comprises a corpus 20 of fully verified text data. An N-gram generator 22 (e.g., 2-gram or 3-gram) goes through the training collection and finds all of the strings of length 1 through length N that exist in the training data. A statistical collector 24 collects all occurrences of the strings L and determines how many times the rule L⇒R is supported in the corpus 20. The strings L along with the number of times that the rule L⇒R has occurred in the corpus 20 are then stored in a database 26.

The rule generator 18 then determines the weighted distribution of the strings L within the trainable database 16 and the database 26. The weighted distribution may be defined in a number of different manners. In this invention, the weighted distribution is defined by the following equation:

$$\text{Weighted Distribution} = \frac{\#\text{Parallel} + \#\text{Corpus}}{\#\text{Parallel}}; \text{wherein} \qquad (2)$$

Parallel is the number of times L occurs in the parallel sample of text and #Corpus is the number of times L occurs in the corpus of fully verified text. For example, if the rule there were made ⇒ the remainder occurred in the parallel sample of text 43 times and occurred in the corpus 8 times, then the weighted distribution of this rule would be approximately 0.84. This weighted distribution suggests that the rule there were made ⇒ the remainder is acceptable and can be expected to reduce the overall transcription error rate on similar data samples.

In many cases, clear cut context-free rules, like the above example are hard to obtain. In this invention, rules with low validity weights (e.g., 50% or less) are an indication that the rules are not valid, and even rules having a weighted distribution ranging from 75–80% may be of little value. In order to produce higher quality rules, the rule generator 18 revises the rules to add context. More specifically, the rule generator 18 refines the preliminary set of context-free rules by fitting them more closely to the existing evidence shown in the parallel samples. This is done by identifying contrasting features within the text surrounding L's occurrences that help better differentiate the strings in the parallel samples of text and the corpus of verified text. The rule generator finds the feature or features for rules and revises them as context-sensitive. The context-sensitive rules are represented by:

$$L \Rightarrow R \qquad (2)$$

$$XLY \Rightarrow XRY, \text{wherein} \qquad (3)$$

X and Y are context features, where either or both could be null. An example of generating a context-sensitive rule is shown with the following pair of sentences:

s1: PORTABLE FROM VIEW OF THE CHEST.

s2: PORTABLE FRONTAL VIEW OF THE CHEST.

The misalignment between the two sentences gives rise to the context-free rule from ⇒ frontal. As this rule is validated with the corpus 20 of verified text, there is some evidence supporting this rule, but there are also many cases where this rule does not apply. An example that may be taken from the corpus 20 of fully verified text is:

. . . ARE UNCHANGED IN POSITION FROM THE PRIOR EXAMINATION.

Therefore, the context-free rule from ⇒ frontal does not apply. However, adding a one-word context of the word VIEW produces a very good correction rule. Accordingly, the context-free rule is replaced with a context-sensitive rule from view ⇒ frontal view.

In addition to context-sensitive rules, the rule generator 18 can generate rules that contain non-terminal symbols. Non-terminal symbols can stand for classes of symbols such as part-of-speech and syntactic categories. An example of a non-terminal symbol is had CD hours ⇒ at CD hours, where CD stands for any number.

The revised rules generated by the rule generator 18 are stored in a correction rules database 28. The rules in the correction rules database 28 are then used by a text corrector 30. In particular, the text corrector 30 applies the revised rules to the speech recognition text data and corrects the text according to the rules. The text aligner 12 aligns the corrected text with the corresponding true transcription of text data. Eventually, more rules are developed by the rule generator 18 and subsequently validated or invalidated by observing their applicability across the corpus of text data. Again the invalidated rules are revised and then applied to the speech recognition text. The resulting text is again aligned with the corresponding true transcription of text data. This cycle continues until all of the rules have been validated or until no further progress is possible. The final correction rules are then ready to be used in the production phase.

Figure 2:
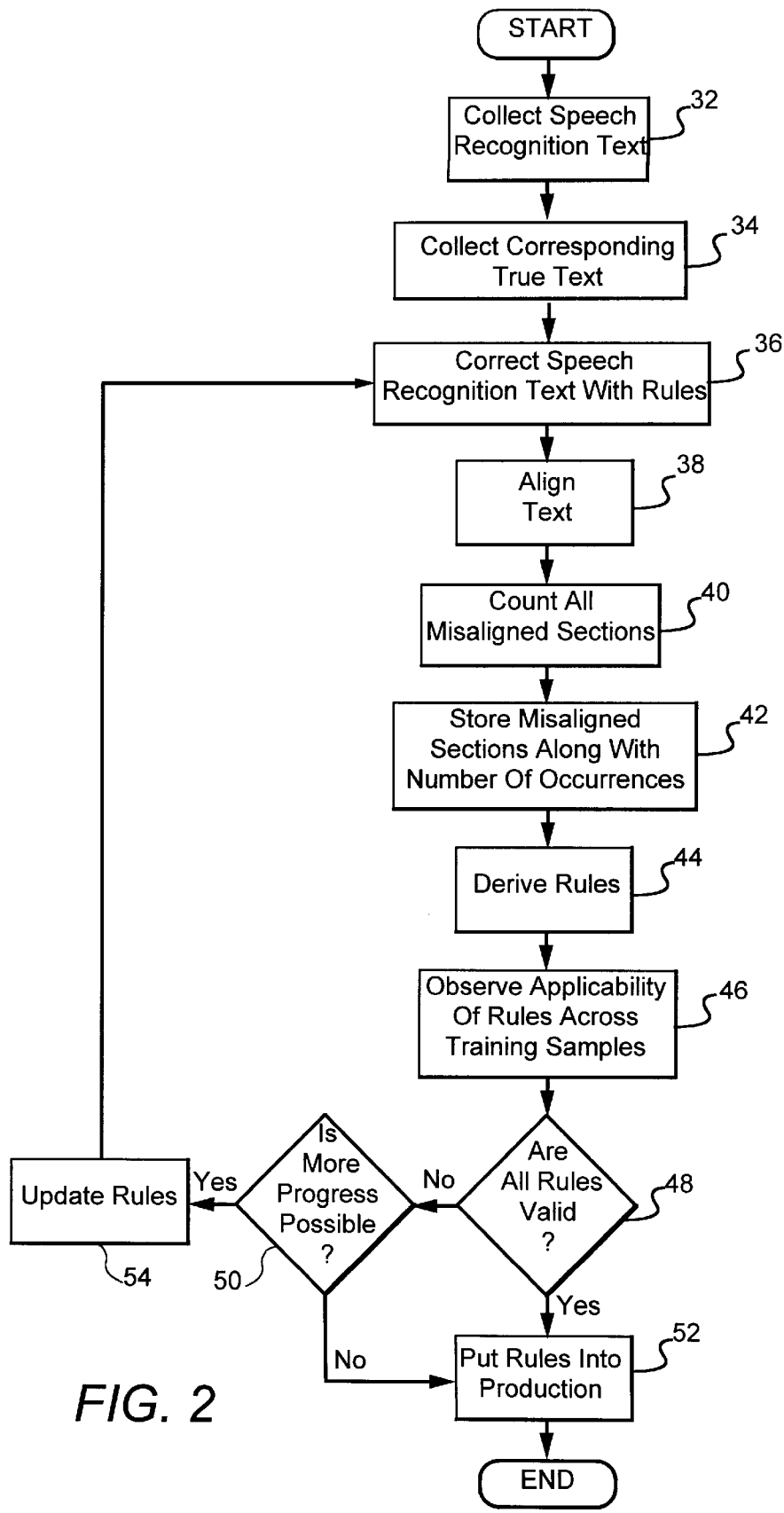
FIG. 2 shows a flow chart summarizing the steps used to obtain the set of correction rules.

FIG. 2 shows a flow chart summarizing the steps used to obtain the correction rules. The processing steps begin at 32 where the text data generated from a speech recognition system is collected. Next, the corresponding true transcription of the text data is collected at 34. The text corrector 30 corrects the speech recognition text data according to any rules developed by the rule generator 18 at 36. Initially, there are no rules and the speech recognition text data passes to the text aligner 12. Then the text aligner 12 aligns the text data with the corresponding true transcription of text data at 38. All of the misaligned sections are sent to the statistical collector 14 which counts the number of times that the misaligned sections have occurred in the training sample of parallel text at 40. The misaligned sections along with the number of times that the misalignment has occurred in the training sample of parallel text are then stored in the trainable database 16 at 42. The rule generator 18 uses the perceived differences in alignment between the speech recognition text data and the corresponding true transcription of text data to derive a set of context-free rules at 44. The applicability of the preliminary replacement rules are observed across the training collection at 46. If all of the rules are determined to be valid at 48 or no further progress can be made at 50, then the rules are ready to be put into the production phase at 52. However, if some of the rules are invalid and more progress is possible, then the rules are revised at 54 to reflect any context-sensitive rules and rules having non-terminal symbols. The revised rules are then applied to the parallel text samples to test their applicability by repeating steps 36–50. This cycle continues until all of the rules have been validated or until no further progress is possible.

Figure 3:
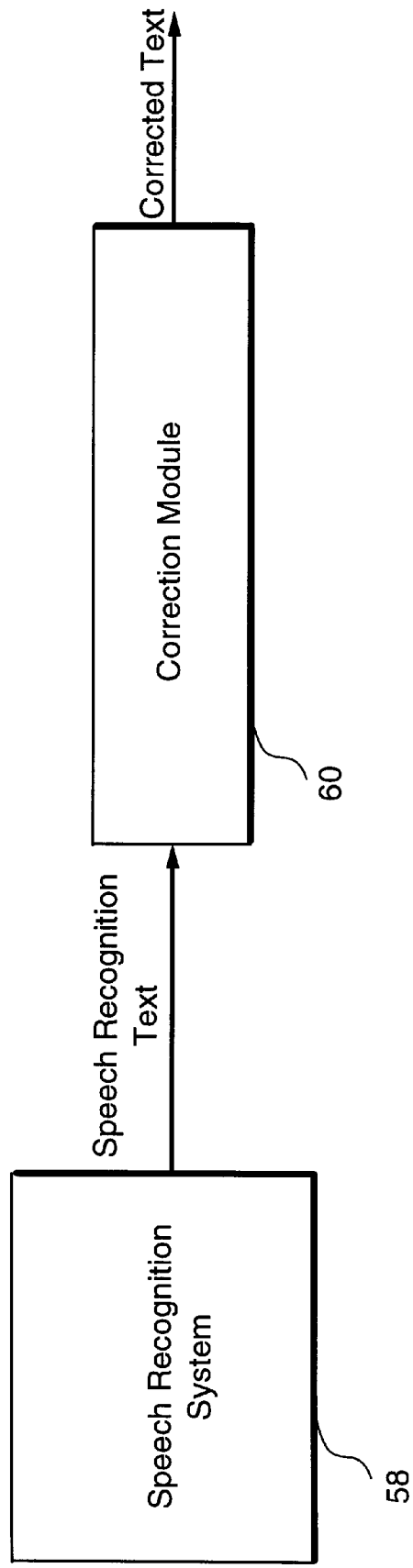
FIG. 3 shows a block diagram of a production unit that is used in this invention to apply the correction rules.

After the final correction rules have been derived then the rules are ready to be used in the production phase. FIG. 3 shows a block diagram of a production unit 56 that is used in this invention to apply the correction rules. In the production unit 56, text data is generated from a speech recognition system 58. Again, the speech recognition system can be either an isolated-word speech recognition system or a continuous speech recognition system. The speech recognition text data is outputted from the speech recognition system 58 and inputted to a correction module 60 which contains the set of correction rules that were developed in the training phase. The correction module 60 then applies the correction rules to the speech recognition text data and accordingly corrects the text data. The corrected text is then outputted from the correction module 60.

Figure 4:
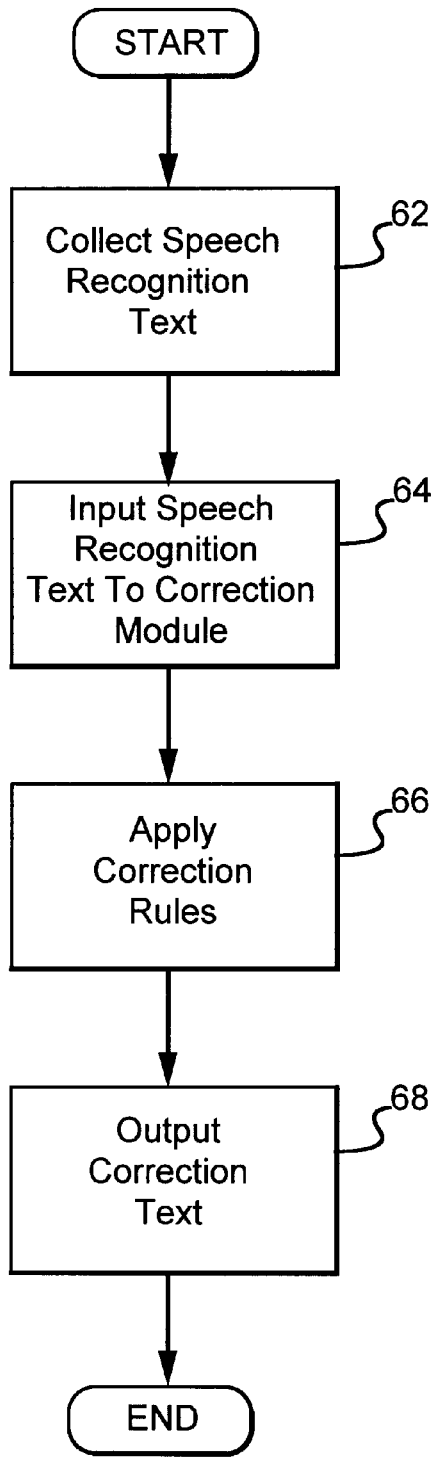
FIG. 4 shows a flow chart summarizing the steps in the production phase according to this invention.

FIG. 4 shows a flow chart summarizing the steps performed in the production phase. The processing steps begin at 62 where the text data generated from the speech recognition system 58 is collected. Next, the speech recognition text data is inputted to the correction module 60 at 64. The correction module applies the correction rules to the speech recognition text data at 66. The corrected text is then outputted at 68.

An example showing this invention in use is provided below. The example is taken from a sample radiology report. The original speech recognition system output is shown below with the errors highlighted in bold.

indication colon and trachea to place.
the endotracheal tube is in size factor position. there is and re-expansion of the right upper lobe. Mild changes of the $8^{th}$ rds persist bilaterally.

The true transcription is as follows:

INDICATION: ENDOTRACHEAL TUBE PLACEMENT.
THE ENDOTRACHEAL TUBE IS IN SATISFACTORY POSITION. THERE HAS BEEN RE-EXPANSION OF THE RIGHT UPPER LOBE. MILD CHANGES OF THE LATE RDS PERSIST BILATERALLY.

The partially corrected text after applying the generated context-free rules is as follows:

indication colon ENDOTRACHEAL TUBE place.
the endotracheal tube is in SATISFACTORY position. there HAS BEEN re-expansion of the right upper lobe. mild changes of the $8^{th}$ rds persist bilaterally.

Note that the corrections have been italicized and uncorrected errors remain in bold. The corrected text after the rules have updated with context-sensitive rules is as follows:

indication: endotracheal tube placement
the endotracheal tube is in satisfactory position. there has been re-expansion of the right upper lobe. mild changes of the $8^{th}$ rds persist bilaterally.

Note that the corrections have been italicized and uncorrected errors remain in bold.

It is therefore apparent that there has been provided in accordance with the present invention, a method and system for improving speech recognition that fully satisfy the aims and advantages and objectives hereinbefore set forth. The invention has been described with reference to several embodiments, however, it will be appreciated that variations and modifications can be effected by a person of ordinary skill in the art without departing from the scope of the invention. For example, instead of using linguistic post processing, the correction module can be fed directly into the language model used by the speech recognition system to improve its baseline performance. In addition, speech recognition systems that use an N-Best sentence module to provide ranked lists of alternative transcriptions, may alleviate the need to use corresponding correct text data in the training phase.

We claim:

1. A method for improving speech recognition, comprising the steps of:
    collecting text data generated from a speech recognition system;
    collecting a corresponding true transcription of the speech recognition text data;
    aligning the text data generated from the speech recognition system with the corresponding true transcription of text data, wherein the aligning is text-based;
    generating a plurality of correction rules from differences in alignment between the text data generated from the speech recognition system and the corresponding true transcription of text data; and
    applying the plurality of correction rules to new text data generated from a speech recognition system.

2. The method according to claim 1, wherein the step of aligning comprises aligning the text data generated from the speech recognition system with the corresponding true transcription of text data on a word level.

3. The method according to claim 2, wherein the step of aligning comprises examining any differences in alignment between the speech recognition text data and the corresponding true transcription of text data.

4. The method according to claim 1, wherein the plurality of correction rules comprise a plurality of context-free rules and a plurality of context-sensitive rules.

5. The method according to claim 4, wherein the plurality of correction rules further comprise a plurality rules containing non-terminal symbols.

6. The method according to claim 1, further comprising the step of validating each of the plurality of correction rules.

7. The method according to claim 6, wherein the step of validating each of the plurality of correction rules comprises the steps of:

specifying a string within the text data generated from the speech recognition system;

applying a correction rule to the specified string; and determining the number of occurrences that the applied correction rule is supported in the corresponding true transcription of text data.

8. The method of claim 7, further comprising the steps of:

collecting a corpus of fully verified text data;

applying the correction rule to the corpus of fully verified text data; and determining the applicability of the correction rule across the corpus of fully verified text data.

9. The method according to claim 8, further comprising the steps of:

revising the correction rule if not supported by the corpus of fully verified text data; and revalidating the revised correction rule.

10. A system for improving speech recognition, comprising:

a text aligner for aligning text data generated from a speech recognition system with a corresponding true transcription of the speech recognition text data, wherein the aligning is text-based;

a rule generator coupled to the text aligner for generating a plurality of correction rules from differences in alignment between the speech recognition text data and the corresponding true transcription of text data; and a rule administrator for applying the plurality of correction rules to new text data generated from a speech recognition system.

11. The system according to claim 10, wherein the text aligner aligns the speech recognition text data with the corresponding true transcription of text data on a word level.

12. The system according to claim 11, wherein the text aligner examines any differences in alignment between the speech recognition text data and the corresponding true transcription of text data.

13. The system according to claim 10, wherein the plurality of correction rules comprise a plurality of context-free rules and a plurality of context-sensitive rules.

14. The system according to claim 13, wherein the plurality of correction rules further comprise a plurality of rules containing non-terminal symbols.

15. The system according to claim 10, further comprising a rule validator for validating each of the plurality of correction rules.

16. The system according to claim 15, wherein the rule validator comprises:

means for specifying a string within the speech recognition text data;

means for applying a correction rule to the specified string; and means for determining the number of occurrences that the applied rule is supported in the corresponding true transcription of text data.

17. The system of claim 16, further comprising:

a corpus of fully verified text data;

means for applying the correction rule to the corpus of fully verified text data; and means for determining the applicability of the correction rule across the corpus of fully verified text data.

18. The system according to claim 17, further comprising:

means for revising the correction rule if not supported by the corpus of fully verified text data; and means for revalidating the revised correction rule.

* * * * *